Figure 1:
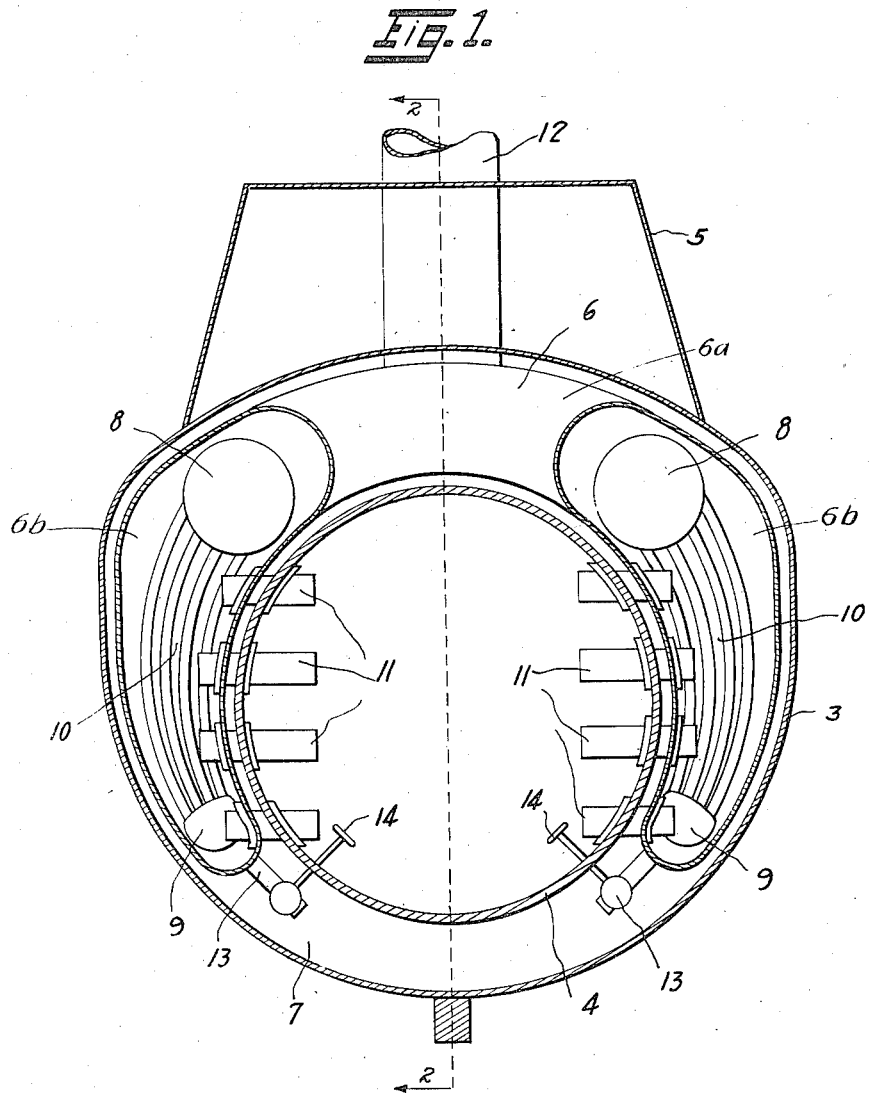

G. C. DAVISON.
WATER TUBE BOILER FOR SUBMARINES.
APPLICATION FILED MAR. 25, 1916.

1,209,678.

Patented Dec. 26, 1916.
2 SHEETS—SHEET 1.

INVENTOR
Gregory C. Davison
BY
ATTORNEYS

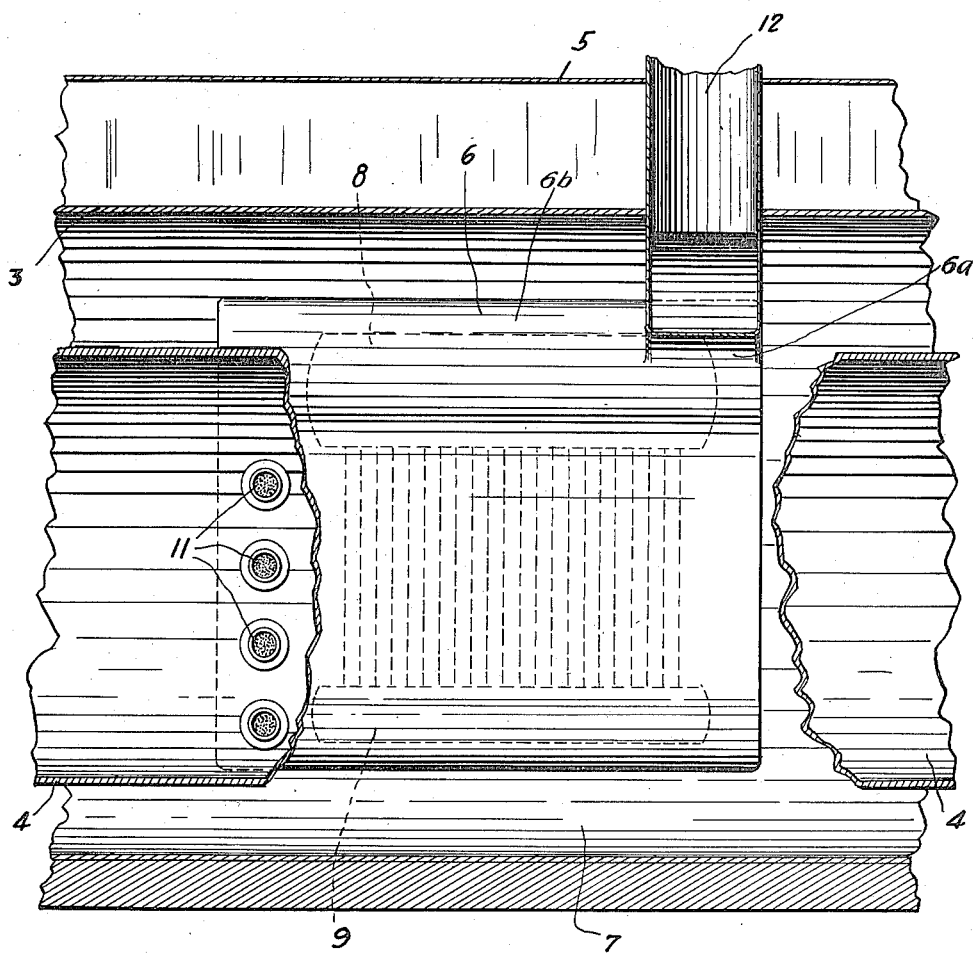

UNITED STATES PATENT OFFICE.

GREGORY C. DAVISON, OF NEW LONDON, CONNECTICUT, ASSIGNOR TO ELECTRIC BOAT COMPANY, A CORPORATION OF NEW JERSEY.

WATER-TUBE BOILER FOR SUBMARINES.

1,209,678.  Specification of Letters Patent.  Patented Dec. 26, 1916.

Application filed March 25, 1916. Serial No. 86,653.

*To all whom it may concern:*

Be it known that I, GREGORY C. DAVISON, a citizen of the United States, residing at New London, in the county of New London and State of Connecticut, have invented certain new and useful Improvements in Water-Tube Boilers for Submarines; and I do hereby declare the following to be a full, clear, and exact description of the invention, such as will enable others skilled in the art to which is appertains to make and use the same.

This invention relates broadly to submarine boats, and more particularly seeks to provide a novel and valuable organization to accommodate efficiently and with economy of space a water-tube boiler installation.

The development of submarines along the lines of very large, high speed vessels requires enormous horse power which can be effectively applied if the submarines are propelled by steam turbines. In this connection it is necessary to use special types of water-tube boilers in order to make the power plant equipment as light as possible and also occupy a minimum amount of space. Particularly there are certain heat conditions to be met and overcome, such special conditions not being encountered in surface vessels or in other relations where installations of steam power plants are made.

It may be stated that one of the advantages possible in connection with a water-tube boiler constructed and installed in a submarine boat as herein described is the elimination of fire-brick for the furnace or combustion chamber, and also of the usual steel casing lagged with magnesia or felt. The use of fire-brick and of such a casing as heretofore practically universally employed is undesirable in many respects. For example, it is dangerous or impossible to quickly cool the fire-brick; and the necessity for such cooling may arise suddenly at frequent intervals.

The latest classes of submarine boat have been of the double hull type, and this type will no doubt become of more and more importance in the future, especially in view of the tendency to construct larger and larger submarines. One of the objects of the present invention, therefore, is to provide an embodiment which may advantageously be installed in the inter-hull space, and preferably in connection therewith to show means whereby the provided boiler compartment may be water cooled at all times and especially upon submergence and whereby also the heat generating plant may be controlled from within the inner hull.

In the accompanying drawings, Figure 1 discloses a transverse sectional view taken through said embodiment; and Fig. 2 is a sectional view taken on the line 2—2 of Fig. 1.

There are shown a submarine's weak outer hull 3, strong inner hull 4, and superstructure 5.

A reniform or saddle-shaped boiler compartment 6 is located in the inter-hull space 7 and is spaced from inner hull 4 and outer hull 3. At suitable points forward and aft of the boiler compartment 6 transverse bulkheads (not shown) may be fitted in the inter-hull space 7 to establish a ballast tank within which will be located the boiler compartment 6.

The saddle-shaped compartment 6, forward or aft of its hump $6^a$, is provided symmetrically with a pair of extensions $6^b$ within each of which is a boiler unit as illustrated. Each of these units includes an upper drum 8, a lower drum 9 and a plurality of tubes connecting the two drums. It will be seen that in the case of each unit a combustion chamber or fire-box 10, to be served by a plurality of fuel-oil burners 11, may be located between the upper and lower drums, and that such combustion chamber will be situated most efficiently in relation to the design of the boiler unit and its residence in boiler compartment 6. A single uptake 12 is provided, and this uptake extends through the superstructure. The fuel-oil burners 11 are manipulated from within the inner hull and direct their flames and hot gases into the combustion chambers 10. The products of combustion pass among the circulating tubes which join the upper and lower drums of each unit, and rise through the uptake 12.

Each combustion chamber 10 may have circulating tubes, either additional to or in substitution for those shown, so spaced and arranged as to line the chamber; and such a construction would probably be highly desirable in order to reduce the heat loss due to radiation.

Whether or not boiler compartment 6 be located within a ballast-tank subdivision of the inter-hull space, preferably the inter-hull space surrounding the compartment 6 is ordinarily either flooded or confined and interposed in a separate circulating system, so that the heat radiating from the boiler may not injuriously affect the hull or other parts of the vessel.

It will be seen that this novel form of boiler provides not only for a very free circulation, but also for a very rapid heating of the circulating medium to the boiling point, and the subsequent generation of steam within each boiler unit; all without undesirably raising the temperature of the boiler compartment 6 or of adjacent parts of the vessel. And these ends are obtained without the provision of fire-brick or the like. This is important for a reason which has already been indicated, that is, it is practically impossible to quickly cool the fire-brick of a boiler and it may even be dangerous to make the attempt. In this connection it should be remembered that a submarine boat is often required to submerge quickly and unexpectedly. In such a case, a boiler including a fire-brick structure is quite unsuitable and might be highly dangerous.

Upon submergence, whether the inter-hull space 7 surrounding compartment 6 be utilized as a valve-controlled ballast tank or be flooded as the result of filling and bailing openings in the outer hull, such flooding of this inter-hull space would act to quickly and safely cool the boiler compartment 6 and its contents. Of course preparatory to submergence the burners 11 would be shut off and suitable covers fitted over the openings through the inner hull around the burners in order to make the inner hull watertight. It would probably be preferable during submergence also to flood the interior of boiler compartment 6, and such a flooding thereof could be anticipated and form a part of the calculations when designing the ballast system for the vessel. To permit of such a flooding of the boiler compartment, connections 13 and valves 14 are provided so as to be operable from within the inner hull as indicated in Fig. 1; and in connection with such a construction it is clear that the flow of cooling water into the boiler compartment 6 could be controlled and graduated properly and safely to obtain thorough and rapid cooling.

I claim:—

1. In a submarine boat of the double hull type, a water-tube boiler in the inter-hull space.

2. In a submarine boat of the double hull type, in combinaton, a compartment in the inter-hull space, and a water-tube boiler in said compartment.

3. In a submarine boat of the double hull type, in combination, a saddle-shaped compartment in the inter-hull space each depending end portion of which establishes a boiler sheath, and a water-tube boiler unit in each sheath.

4. In a submarine boat of the double hull type, in combination, a saddle-shaped compartment in the inter-hull space and taking about the roof and sides of the inner hull, and a water-tube boiler in said compartment.

5. In a submarine boat of the double hull type, in combination, a saddle-shaped compartment in the inter-hull space each depending end portion of which establishes a boiler sheath, separate water-tube boiler units in each sheath, and an uptake from the compartment located above the hump of the compartment.

6. In a submarine boat of the double hull type and having a superstructure, a saddle-shaped compartment in the inter-hull space each depending end portion of which establishes a boiler sheath, separate water-tube boiler units in each sheath, and an uptake from the compartment extending through the superstructure.

7. In a submarine boat of the double hull type, in combination, a water-tube boiler in the inter-hull space, and a plurality of fuel-oil burners extending through the wall of the inner hull and into the compartment.

8. In a submarine boat of the double hull type, in combination, a saddle-shaped compartment in the inter-hull space each depending end portion of which establishes a sheath, separate water-tube boiler units in each sheath, and two groups of fuel-oil burners extending through the wall of the inner hull one group into each of said sheaths.

9. In a submarine boat of the double hull type, in combination, a compartment in the inter-hull space, a water-tube boiler in said compartment, and a connection operable from the interior of the inner hull whereby upon submergence of the vessel sea water may be caused to flood the compartment to cool the same and the boiler.

10. In a submarine boat of the double hull type, in combination, a saddle-shaped compartment in the inter-hull space taking about the roof and sides of the inner hull, a water-tube boiler in said compartment, an uptake from the compartment communicating at its upper end with the exterior of the vessel, and connections operable from within the inner hull whereby upon submergence of the vessel sea water may be caused to flood the compartment to cool the same and the boilers therein.

11. In a submarine boat of the double hull type, in combination, a saddle-shaped compartment in the inter-hull space taking about the roof and sides of the inner hull, and a water-tube boiler unit in opposite end portions of the compartment, each unit including an upper drum, a lower drum and a plurality of tubes joining the two drums, and a combustion chamber between the two drums.

12. In a submarine boat of the double hull construction, in combination, a ballast tank located within the inter-hull space, a boiler compartment located within the ballast tank and spaced from the bounding walls of the ballast tank, a water-tube boiler located in the boiler compartment, burners extending through the wall of the inner hull and the wall of the boiler compartment, and means for flooding said boiler compartment upon submergence of the vessel and operable from within the inner hull.

13. In a submarine boat, in combination, a ballast tank, a boiler compartment wholly within the ballast tank and an oil-burning boiler arranged in the boiler compartment.

14. In a submarine boat, in combination, a ballast tank, a boiler compartment wholly within the ballast tank, an oil-burning boiler within the compartment and a valve-controlled connection for admitting water from the ballast tank to the boiler compartment to cool the boiler when the vessel is submerged.

In testimony whereof I affix my signature.

GREGORY C. DAVISON.